No. 849,576. PATENTED APR. 9, 1907.
R. SCHULZ.
PACKING FOR ROTATING MACHINE PARTS.
APPLICATION FILED APR. 16, 1906.
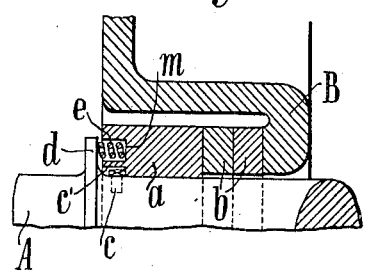
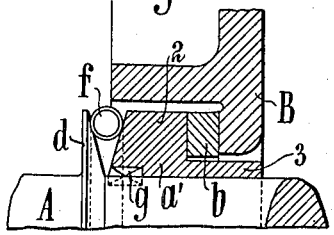
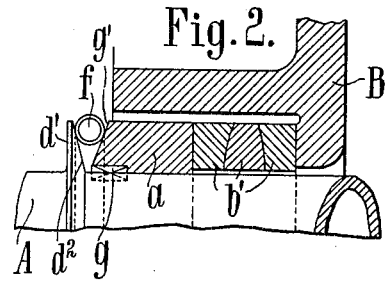
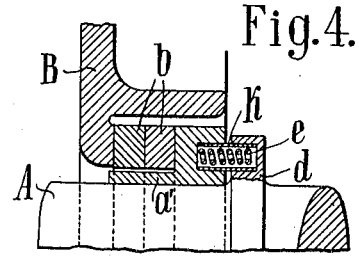
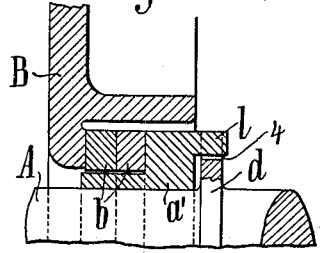
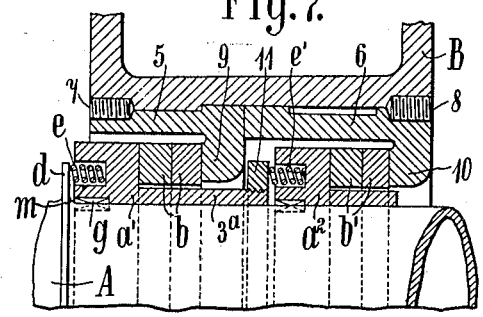
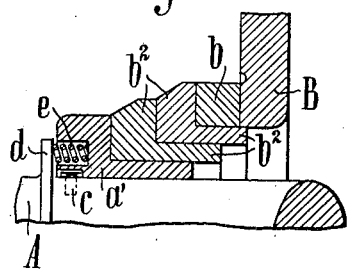
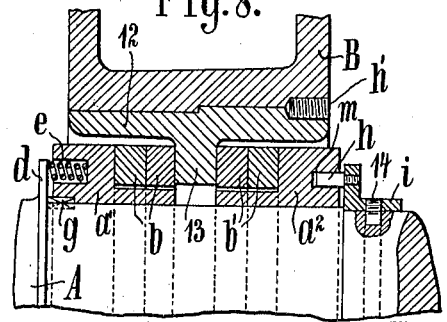

UNITED STATES PATENT OFFICE.

RICHARD SCHULZ, OF BERLIN, GERMANY.

PACKING FOR ROTATING MACHINE PARTS.

No. 849,576. Specification of Letters Patent. Patented April 9, 1907.

Application filed April 16, 1906. Serial No. 312,009.

*To all whom it may concern:*

Be it known that I, RICHARD SCHULZ, a subject of the King of Prussia, residing at Berlin, Germany, have invented certain new and useful Improvements in Packings for Rotating Machine Parts; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification My invention relates to packings for rotating machine parts, and more particularly applicable in steam or pressure air turbines for rotating journals and the like, and has for its object to construct the parts so as to decrease the wear on the machine parts as well as increase the life of the parts of the packing.

In the drawings, in which like parts are similarly designated, Figure 1 shows one form of my arrangement of packing in section. Fig. 2 is a like view showing a modification. Fig. 3 shows a modified form of main ring, Figs. 4 and 5, modifications of means for mounting the main ring; Fig. 6, a modification of some of the auxiliary rings; Fig. 7, a double packing, and Fig. 8 a modification of Fig. 7.

In all of the views the structure of the packing is shown in vertical longitudinal section.

Referring more particularly to Fig. 1, A is a portion of a shaft or other rotating element, preferably, but not necessarily, provided with a flange $d$, and B is the stationary member of the machine, in which the rotating element is mounted or between which and the rotating element it is desired to use a packing. On the rotating element A is a main packing-ring $a$, displaceable by the excess pressure of driving fluid exerted on its one end and having a groove $c'$, into which projects the head or end of a screw, pin, or the like $c$, to prevent the ring $a$ from turning on the rotating element A, but permitting it to have a slight longitudinal movement on the rotating element. The auxiliary rings $b$, of which any desired number may be used, are free to rotate on the rotating element and are located between the main ring $a$, non-rotatively mounted on A, and the stationary member B of the machine. The main ring $a$ may be provided with recesses $m$, in which are contained coil-springs $e$, that press against the flange $d$ to urge the rings against the stationary member B and automatically compensate for wear.

In Fig. 2 the rotating element A, which may be hollow or not, is provided with a flange $d'$, having a beveled face $d^2$, and the main ring $a$ is prevented from rotating by means of a key $g$, which also permits slight longitudinal movement. The ring $a$ is also provided with an inclined or beveled face $g'$, between which and the face $d^2$ of the flange $d'$ there is formed a groove V-shaped in section, in which is seated a hollow spring-ring $f$, surrounding the shaft that acts as a substitute for the springs, Fig. 1, to urge the packing against the stationary member B. The auxiliary rings $b'$, three of which are shown, have curved faces contacting with one another, as shown.

In Fig. 3 I have shown a structure similar to that shown in Fig. 2, but in which the main ring $a'$ has a body portion 2 and a projecting flange 3, that lies along A, giving to the ring-section the shape of an angle, and on the flange 3 of which the auxiliary ring or rings $b$ are mounted.

Fig. 4 shows a modification of the means for preventing the rotation of the main ring. The ring $a'$ is here provided with recesses registering with similar recesses in the flange $d$, and a metal tube $k$ is placed in the registering recesses, acting to key them together, and within each tube $k$ is a spring $e$, urging the main ring $a'$ and auxiliary rings $b$ against B. Here, as in the other cases, the main ring $a'$ is displaceable by the excess pressure of the driving fluid exerted on its outer end.

In Fig. 5 the main ring $a'$ is provided with one or more lugs $l$, that project into one or more transverse notches 4 in flange $d$.

In Fig. 6 the main ring $a'$, having the largest section, is angular and carries on its flange two auxiliary rings $b^2$, fitting into one another or nested and of like or similar section, and the third ring $b$ seats in the angle of the next adjacent ring $b^2$ and abuts against the fixed member B of the machine.

In Fig. 7 is shown the arrangement of my packing to meet the condition where there is steam-pressure on both sides of the member B, the highest pressure being on the left-hand side. The member B is provided with two packing-crowns 5 and 6, removably held in place by screws 7 and 8, respectively. These crowns have internal flanges 9 and 10, respectively, against which the rings press. There are two sets of rings $a'$ $b$ and $a^2$ $b'$, engaging the flanges 9 and 10, respectively. The main ring $a'$ of the first set is slidably but non-rotatively held on shaft or drum A by means of the key $g$, the springs or spring $e$ in recesses or recess $m$ pressing against the flange $d$ on the shaft or drum to urge the ring $a'$ toward flange 9. The auxiliary rings $b$ are seated in the angle on the flange $3^a$ of ring $a'$, which is extended beyond the stationary internal flange 9 and threaded on its end. This threaded portion has screwed on it a ring 11, as shown, which serves the same purpose as flange $d$ for the second set of packing-rings, of which the one $a^2$ is slidably but non-rotatively mounted on A, the springs $e'$ pressing against 10, urging the main ring $a^2$ and the auxiliary rings on the flange thereof against 10.

In the arrangement Fig. 8 the condition is met where there is a high pressure first on one side and then on the other side of the stationary member B, which member is provided with a ring 12, held in place by screws $h'$ and has an internal flange 13, against which two sets of packing-rings are urged, those on the left, $b$, similar to the structures already described, being urged toward the right against the flange 13. The other set urged toward the left, is mounted, as shown, an angle-piece $i$ being secured to the rotating element A by means of a screw or pin 14, and in the upstanding flange of the angle-piece $i$ is pin $h$, entering a recess $m$, that prevents the main ring $a^2$ from rotating on A. The packing is exceedingly well adapted for rotating elements of large diameter and for high speeds. The greater the speed of the rotating element A the greater should be the number of free sliding or auxiliary rings $b$, and for a given speed the relative wear on the rings decreases with the increase in the number of rings used in a set.

In all of the figures it will be observed that there is a main ring locked to the rotating element, so as to have a limited longitudinal sliding motion and one or more free auxiliary rings to rotate between the main ring and a stationary member, so that the friction will be distributed between the several rubbing-faces of the rings. The steam-pressure on the end of the main ring preferably, but not necessarily, assisted by auxiliary means, such as springs, holds the rings tightly together and against the fixed member B or a flange secured thereto. The several auxiliary rings will rotate according to the relative friction between their faces, and their speed of rotation will diminish according to the number used from the main ring toward the fixed member B. Such packings are particularly applicable to steam-turbines.

Having now described my invention, what I claim, and desire to secure by Letters Patent, is—

1. In a packing for rotating elements, the combination with the rotating element and the stationary member in which said element is mounted; of a main ring locked to the rotating element and axially slidable thereon and an auxiliary free friction-ring between said main ring and stationary member, substantially as described.

2. In a packing, the combination with the rotating element and the stationary member in which said element rotates; of a main ring locked to and longitudinally slidable on the rotating element and free auxiliary friction-rings between said main ring and stationary member, substantially as described.

3. In a packing, the combination with the rotating element and the stationary member in which the said element rotates; of a main ring locked to and longitudinally slidable on the element, free auxiliary rings between the main ring and member and means to urge the rings against the stationary member, substantially as described.

4. In a packing, the combination with the rotating element, a flange thereon, and the stationary member in which the element rotates; of a main ring locked to and longitudinally slidable on the rotating element, auxiliary free rings between the main ring and member and resilient means between the flange and main ring to urge the rings toward the stationary member, substantially as described.

5. In a packing, the combination with the rotating element and the stationary member in which the element rotates; of a main ring having a flange, means to lock the main ring to the rotating element and permit its longitudinal movement, and auxiliary rings mounted free on the flange of the main ring and between it and the stationary member, substantially as described.

6. In a packing, the combination with the rotating element and the stationary member in which the element rotates; of a main ring having a flange, means to lock the main ring to the rotating element and permit longitudinal movement, a plurality of free auxiliary nested rings between the main ring and stationary member, substantially as described.

7. In a packing, the combination with the rotating element having a flange thereon and the stationary member in which it rotates; of a main ring having a flange, means to lock said ring to the element and permit longitudinal movement, springs between the flange on the element and main ring and free auxiliary nested flanged rings between the main ring and member, substantially as described.

8. The combination with the rotating element and the stationary member in which the element rotates; of a plurality of sets of packing-rings each set composed of a main ring longitudinally slidable on and non-rotatively locked to the rotating element, and free auxiliary friction-rings between the main rings and member, substantially as described.

9. The combination with the rotating element having a flange thereon and the stationary member in which said element is mounted; of an internal flange on the stationary member, a main ring longitudinally slidable and non-rotatively locked to the rotating element, free auxiliary rings between the main ring and flange on said member, and resilient means between the flange on the element and main ring to urge the rings against the internal flange.

10. The combination with the rotating element having a flange and the stationary member in which said element rotates; of removable internal flanges secured to the stationary member, a plurality of sets of packing-rings, each set coöperating with an internal flange, the first set of said rings comprising a main flanged ring longitudinally slidable and non-rotatively locked to the rotating element, a plurality of free auxiliary rings mounted on the flange of the main ring and between the body thereof and the first internal ring, means between the flange on the element and main ring to urge the rings against the first internal flange and a following set of packing-rings comprising a main ring and auxiliary rings and means between the two main rings to urge the following set of rings against the second internal flange, substantially as and for the purpose set forth.

In testimony that I claim the foregoing as my invention I have signed my name in presence of two subscribing witnesses.

RICHARD SCHULZ.

Witnesses:
JOHANNES HEIN,
HENRY HASPER.